(12) United States Patent
Nakhla

(10) Patent No.: US 7,427,104 B2
(45) Date of Patent: Sep. 23, 2008

(54) CHILD SEAT WITH RECESS FOR VEHICLE HEAD REST

(75) Inventor: Said Nakhla, Clarkston, MI (US)

(73) Assignee: Britax Child Safety, Inc., Charlotte, NC (US)

( * ) Notice: Subject to any disclaimer, the term of this patent is extended or adjusted under 35 U.S.C. 154(b) by 67 days.

(21) Appl. No.: 11/162,554

(22) Filed: Sep. 14, 2005

(65) Prior Publication Data
US 2007/0057543 A1    Mar. 15, 2007

(51) Int. Cl.
*A47D 1/10* (2006.01)
(52) U.S. Cl. ............................ 297/254; 297/250.1
(58) Field of Classification Search ............ 297/254, 297/250.1
See application file for complete search history.

(56) References Cited

U.S. PATENT DOCUMENTS 3,632,165 A * 1/1972 Miller ..................... 297/254

5,332,285 A    7/1994 Sinnhuber
6,428,099 B1 * 8/2002 Kain ..................... 297/256.1

FOREIGN PATENT DOCUMENTS

| DE | 4230879 A1 | 4/1993 |
|---|---|---|
| DE | 4409331 | 5/1995 |
| FR | 2716844 A1 | 9/1995 |
| GB | 2287646 | 9/1995 |

* cited by examiner

*Primary Examiner*—Rodney B. White
(74) *Attorney, Agent, or Firm*—Adams Intellectual Property Law, P.A.

(57) ABSTRACT

A child seat for a vehicle seat with a protruding vehicle head rest includes a seat bottom for being supported on the vehicle seat, and a seat back carried by the seat bottom for providing back support to an occupant of the child seat. A recess is disposed in an upper end of the seat back and is positioned and adapted to receive the vehicle head rest and allow the vehicle head rest to protrude therethrough. Optionally, a supplemental head rest may be provided which is releasably securable in the recess.

15 Claims, 6 Drawing Sheets

CHILD SEAT WITH RECESS FOR VEHICLE HEAD REST

BACKGROUND OF THE INVENTION

This invention relates to a child's safety seat, and more particularly to a child seat with an opening for accommodating a vehicle head rest. Child seats and booster seats are commonly used in vehicles to transport children that are too small to safely use only the vehicles' built-in restraint systems. This type of child seat, which typically includes a seat back and seat bottom, is placed on one of the vehicle's seats, usually the rear seat, and optionally secured thereto with the vehicle's restraint system. The child is then placed in the child seat and secured with a separate harness, the vehicle's restraint system, or a combination thereof.

To provide the intended level of protection, the child seat must be installed so that its back is in solid contact with the back of the vehicle seat. However, many vehicles are now equipped with integral head rests on the back seats, and government regulation FMVSS 202 will soon require all rear vehicle seats to have integral head rests. These vehicle head rests project outwards from the seat back and interfere with the correct installation of the child safety seat, since the child seat back cannot sit flush with the vehicle seat back.

SUMMARY OF THE INVENTION

Therefore, it is an object of the invention to provide a child safety seat that can be installed in a vehicle with an integral head rest.

It is another object of the invention to provide a child safety seat with a removable head rest.

It is another object of the invention to provide a child safety seat that uses a vehicle head rest.

These and other objects of the present invention are achieved in the preferred embodiments disclosed below by providing a child seat for being secured to a vehicle seat having a protruding vehicle head rest, the child seat including a seat bottom and a seat back, wherein the upper end of the seat back defines a recess adapted to receive the vehicle head rest.

According to another embodiment of the invention, the child seat further includes a harness comprising one or more releasably connectable straps.

According to another embodiment of the invention, the harness includes two shoulder straps and a crotch strap which are releasably connected to a centrally positioned buckle.

According to another embodiment of the invention, the recess is defined by two upright, spaced-apart side walls and a bottom wall.

According to another embodiment of the invention, the seat further includes a fabric dress cover surrounding the seat back and seat bottom.

According to another embodiment of the invention, the seat further includes a supplemental head rest adapted to fit within the recess.

According to another embodiment of the invention, the seat further includes means for releasably securing the supplemental head rest to the seat back.

According to another embodiment of the invention, the supplemental head rest includes: at least one downwardly-extending rod carrying a moveable latch; and a control for selectively moving the latch between an extended position and a retracted position.

The seat back includes a cavity for receiving the rod.

According to another embodiment of the invention, a child seat includes a seat bottom for being supported on a vehicle seat having a protruding vehicle head rest; a seat back carried by the seat bottom for providing back support to an occupant of the child seat; and a recess disposed in an upper end of the seat back adapted to receive the vehicle head rest and allow the vehicle head rest to protrude therethrough.

According to another embodiment of the invention, a method of placing a child seat in a vehicle including a vehicle seat having a bottom cushion, a back cushion, and a vehicle head rest includes: providing a child seat comprising a seat bottom and seat back, wherein the upper end of the seat back defines a recess adapted to receive the vehicle head rest; placing the child seat bottom against the bottom cushion of the vehicle seat; and placing the child seat back against the back cushion vehicle seat back with vehicle head rest received in and protruding forward through the recess, such that the child seat back is disposed in solid contact with the back cushion.

BRIEF DESCRIPTION OF THE DRAWINGS

The invention may be best understood by reference to the following description taken in conjunction with the accompanying drawings in which.

DESCRIPTION OF THE PREFERRED EMBODIMENT AND BEST MODE

Figure 1:
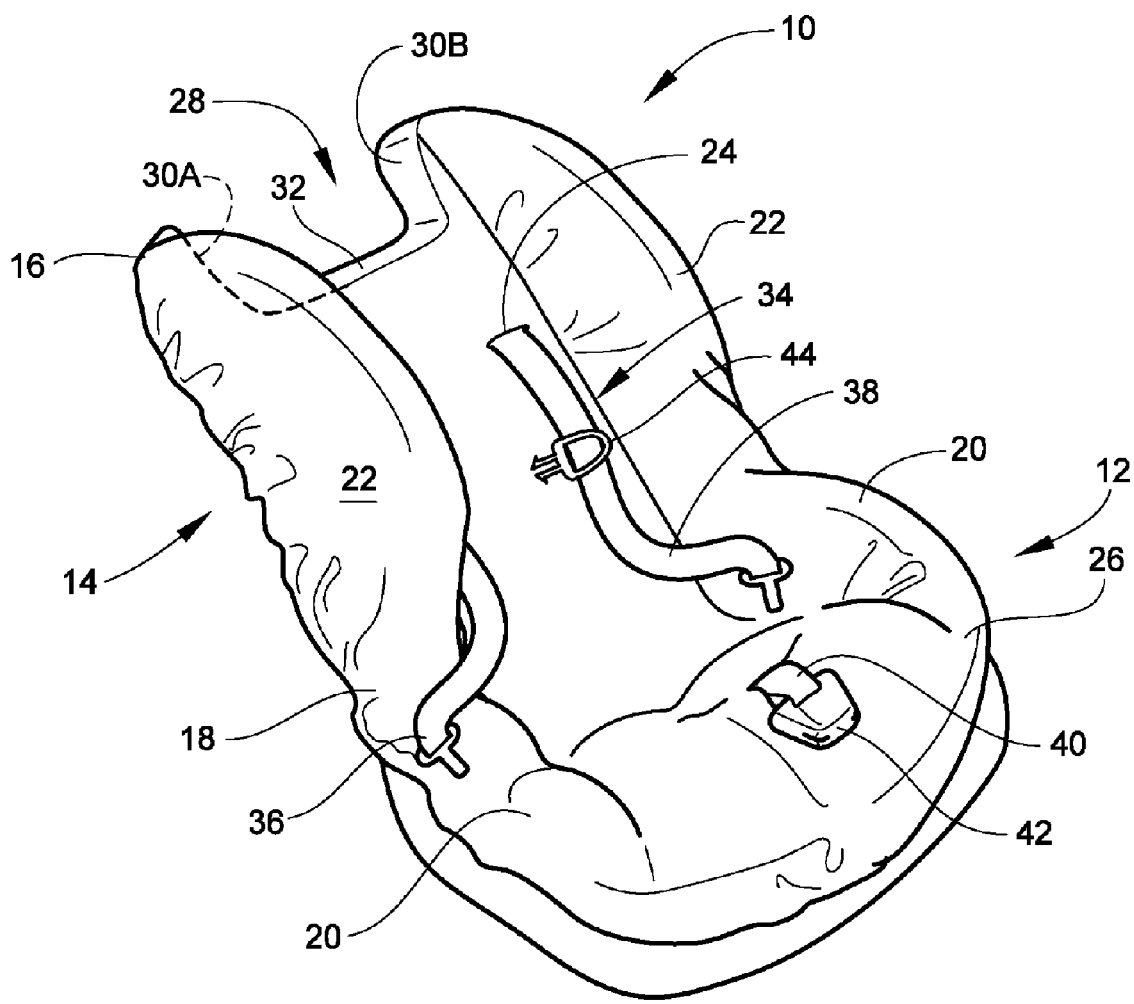
FIG. 1 is a perspective view of a child seat constructed according to the present invention.

Referring now specifically to the drawings wherein identical reference numbers denote the same elements throughout the various views, a child seat according to the present invention is illustrated in FIG. 1 and shown generally at reference numeral 10.

The seat 10 includes a seat bottom 12 and a seat back 14 having upper and lower ends 16 and 18, respectively. The seat bottom 12 includes a pair of arm rests 20. The seat back 14 includes side bolsters 22, and harness guides 24. The seat bottom 12 and the seat back 14 may be constructed separately, or they may be formed as part of a single integral shell. The seat back 14 and seat bottom 12 are covered with padding and a fabric dress cover 26 of a known type. The upper end 16 of the seat back 14 defines a recess 28 which is adapted to receive a vehicle head rest, as described in more detail below. The exact shape and dimensions of the recess 28 may be varied to suit a particular application. In the illustrated example, the recess is defined by two upright, spaced-apart side walls 30A and 30B, and a bottom wall 32.

The child seat 10 is typically fitted with a harness 34 comprising shoulder straps 36 and 38 and a crotch strap 40 which are interconnected by a centrally positioned releasable buckle 42. The shoulder straps 36 and 38, and crotch strap 42 are anchored to the child seat 10 in a known manner. The shoulder straps 36 and 38 may be attached to each other with a chest latch 44 positioned in the center of the harness 34. The harness 34 serves to secure a child occupant in the child seat 10. It should be noted that the present invention is equally applicable to so-called "booster seats" which are intended for larger children and which do not include the harness 34. Otherwise, these booster seats are substantially similar in construction to the child seat 10.

Figure 2:
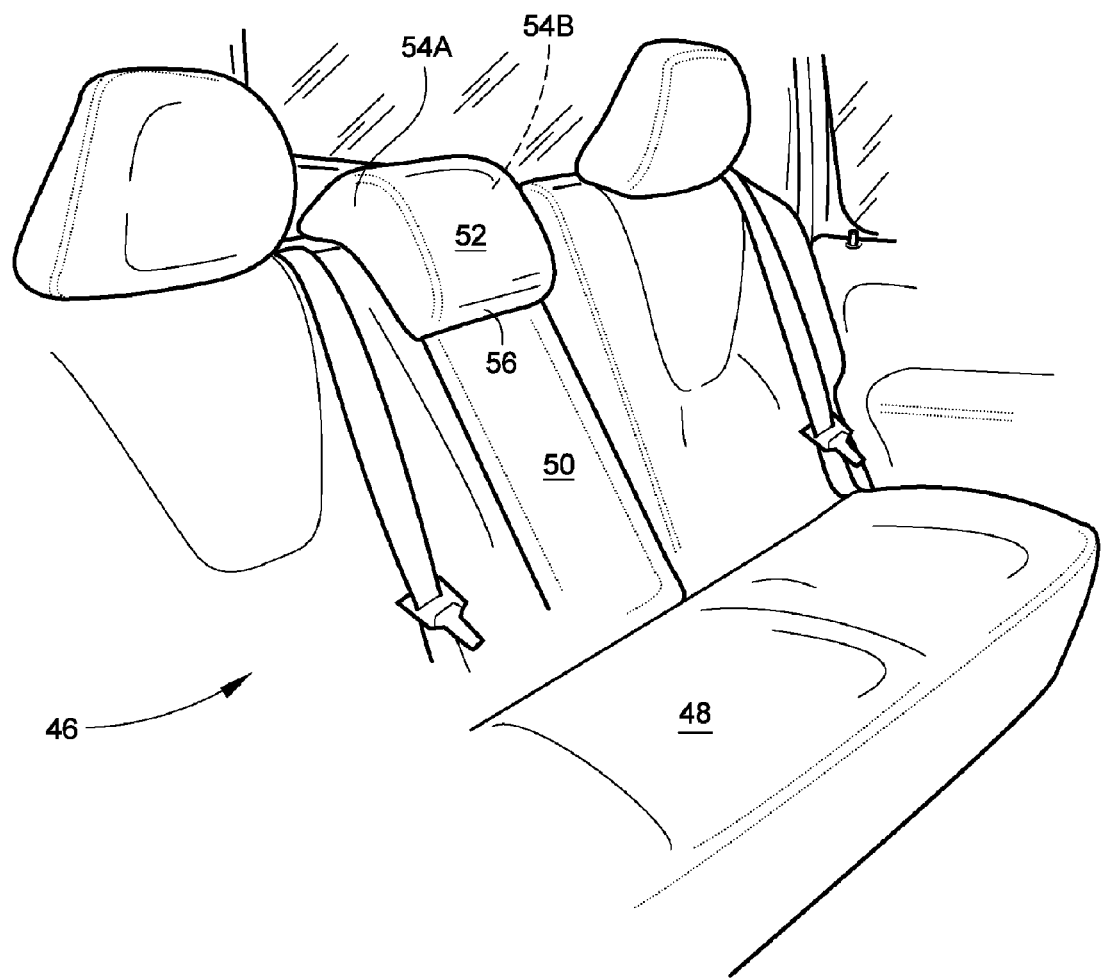
FIG. 2 is a perspective view of the back seat of a vehicle having an integral head rest.

FIG. 2 illustrates a known type of vehicle seat 46 which includes a bottom cushion 48 and a back cushion 50. A vehicle head rest 52, which may be permanently installed or removable, is positioned at the top of the back cushion 50. The vehicle head rest 52 is defined by side edges 54A and 54B, and a bottom edge 56.

Figure 3:
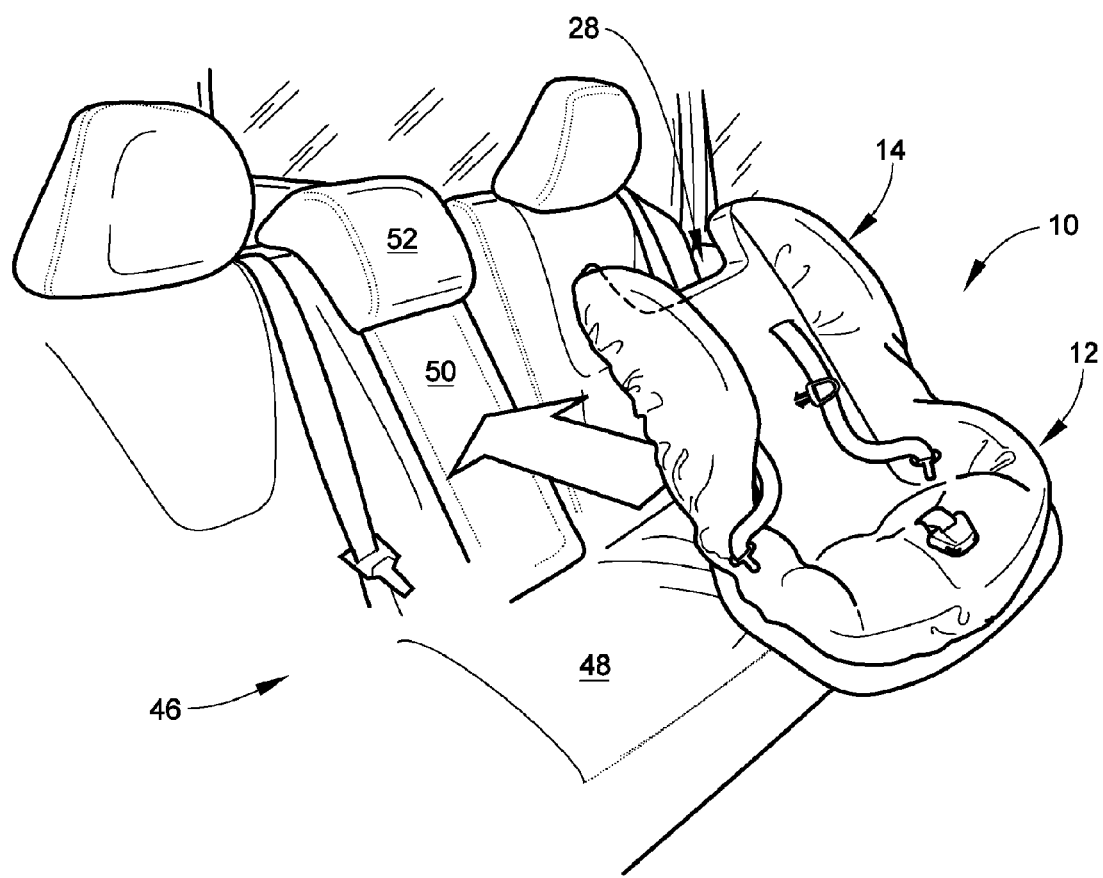
FIG. 3 is a perspective view of the child seat of FIG. 1 being placed on the vehicle seat of FIG. 2.
Figure 4:
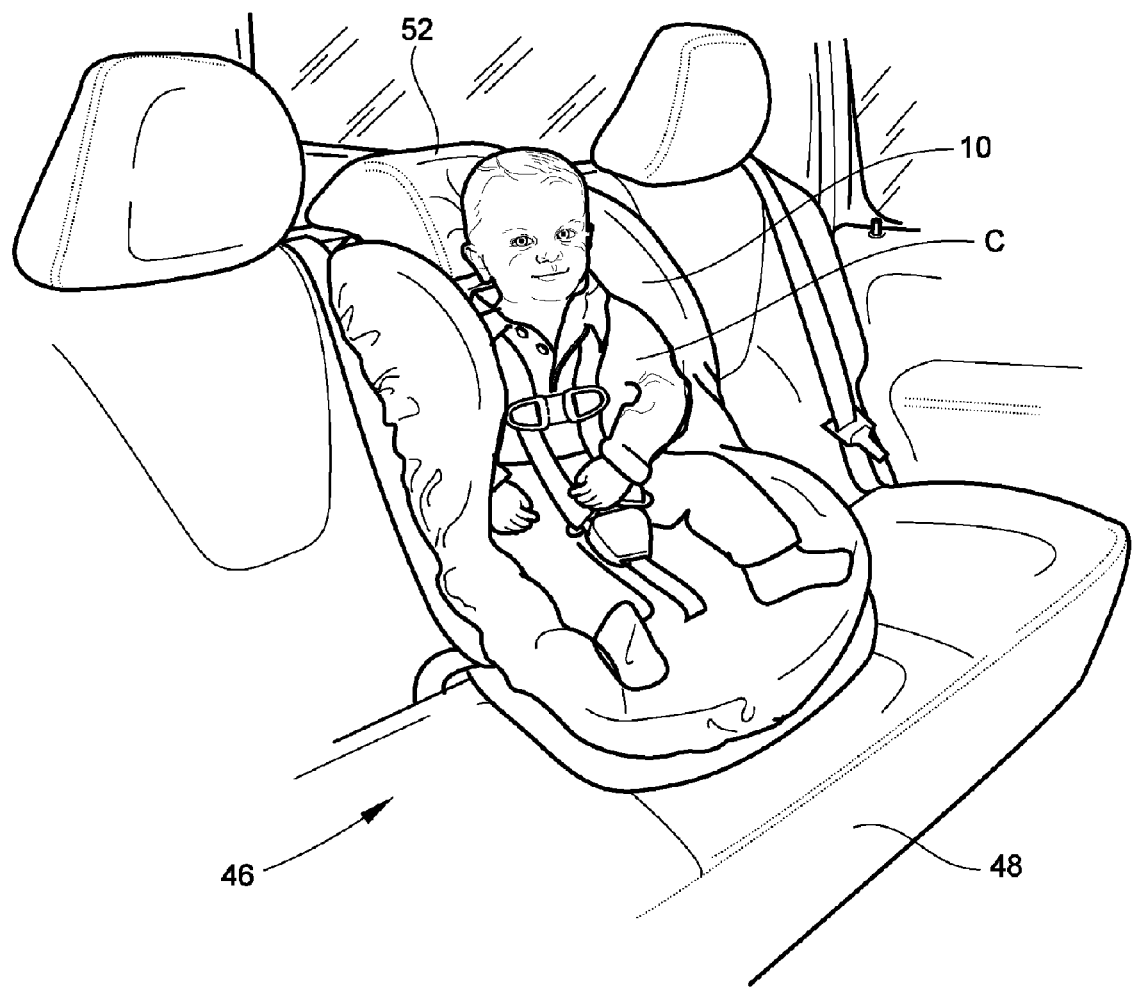
FIG. 4 is a perspective view of the child seat of FIG. 1 in a final position on the vehicle seat of FIG. 2.

FIGS. 3 and 4 illustrate the installation of the child seat 10 to the vehicle seat 46. The seat bottom 12 is placed on the bottom cushion 48 of the vehicle seat 46, and the seat back 14 is placed against the back cushion 50 of the vehicle seat 46, so that the recess 28 receives the vehicle head rest 52. More specifically, the bottom wall 32 of the recess 28 fits under the bottom edge 56 of the vehicle head rest 52, and the side walls 30A and 30B of the recess 28 are positioned outboard of the side edges 54A and 54B respectively, of the vehicle head rest 52. This allows the seat back 14 to fit in solid contact with the back cushion 50, rather than being pushed away from the back cushion 50, as would be the case if the recess 28 were not present. The vehicle head rest 52 protrudes forward through the recess 28, and functions in the same manner as if it were integral to the child seat 10. As shown in FIG. 4, the head of a child "C" is supported by the vehicle head rest 52 and protected in the case of a vehicle accident. For illustrative purposes, the seat 10 in FIG. 4 is shown positioned in the middle of the vehicle seat 46, but may be placed in any of the other seating positions on the vehicle seat 46.

Figure 5:
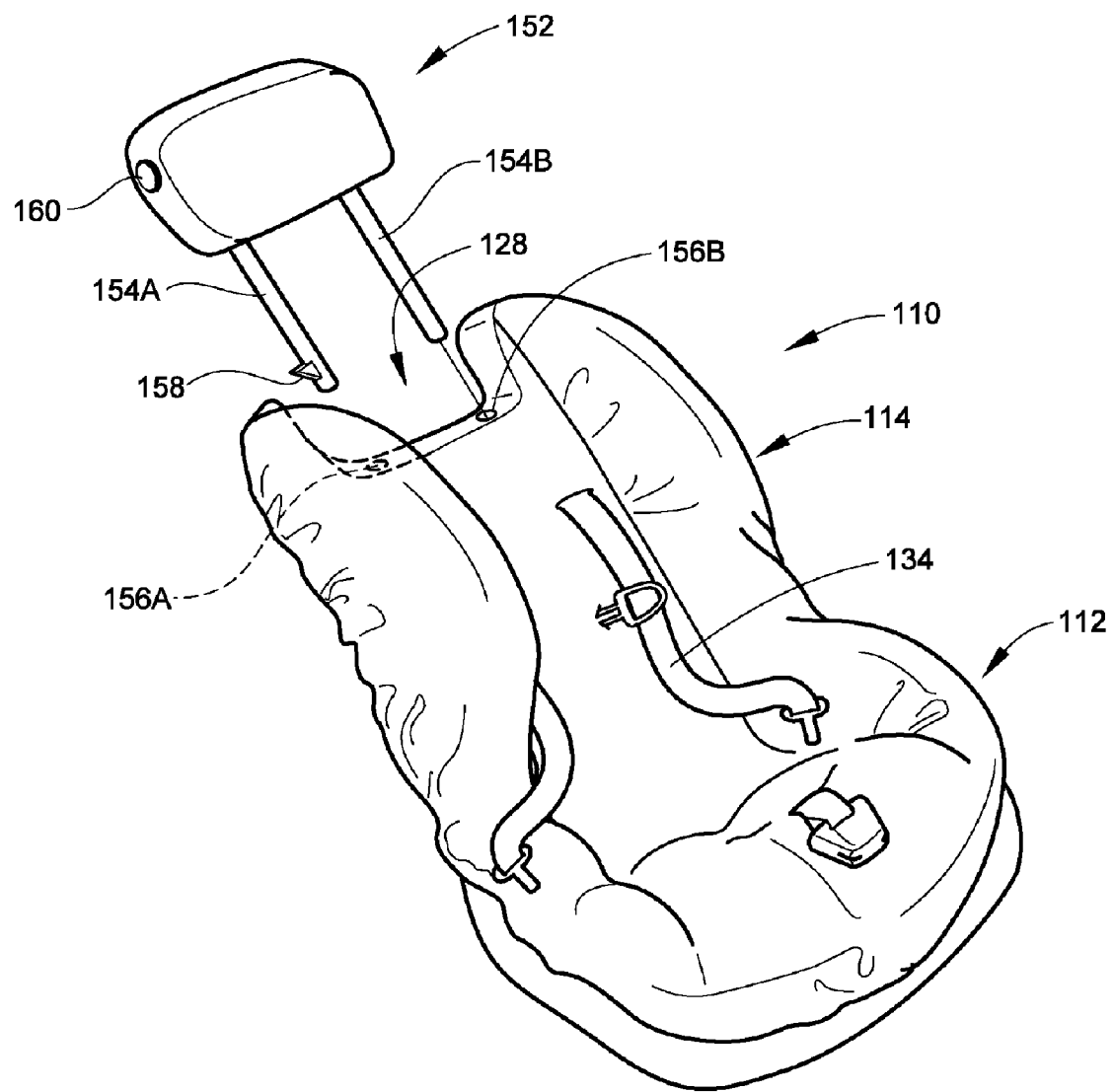
FIG. 5 is a perspective view of the child seat of FIG. 1 with the head rest attached thereto.
Figure 6:
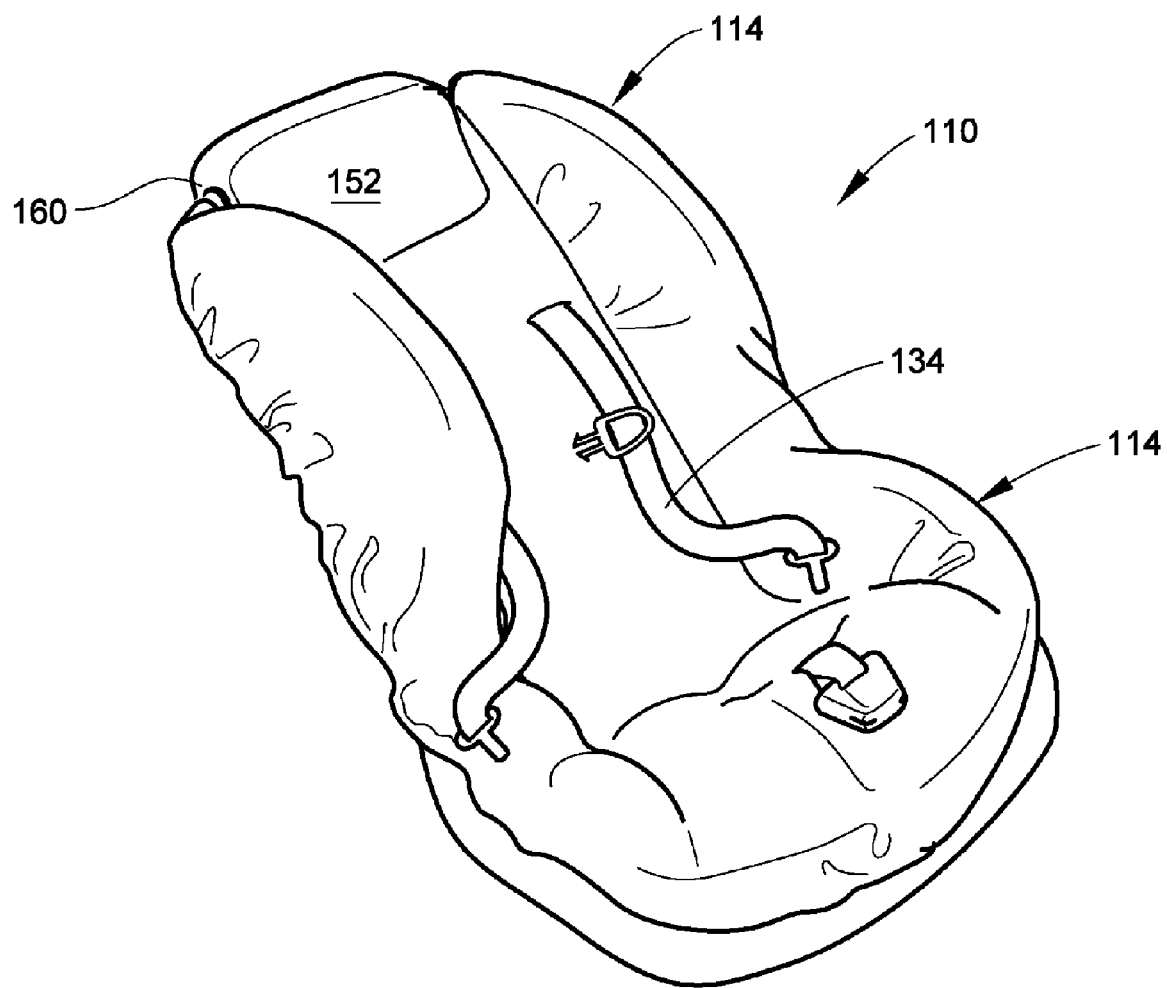
FIG. 6 is a perspective view of an alternative child seat and a head rest for use therewith.

FIGS. 5 and 6 illustrate an alternative child seat 110. The child seat 110 is substantially identical in construction to the child seat 10 and includes a seat bottom 112, a seat back 114 with a recess 128 therein, and a harness 134. A supplemental head rest 152 is provided which is sized to fit into the recess 128. Means are provided for releasably securing the supplemental head rest 152 to the seat back 114. In the illustrated example, two rods 154A, 154B extend from the supplemental head rest 152, and are received by two cavities 156A, 156B located on the seat back 114. At least one moveable latch 158 is carried by one of the rods 154 for engaging one of the cavities 156. A button 160 or other control on the supplemental head rest 152 is operably connected to the latch 158 for selectively releasing it. Any other mechanism which permits the supplemental head rest 152 to be releasably secured to the seat back 114 may be substituted for the rods 154 and latch 156.

When the supplemental head rest 152 is removed, the child seat 110 is capable of being used with vehicle seats having integral head rests, as described above with respect to the child seat 10. The child seat 110 also has the flexibility to be used with vehicles that do not have head rests by installing the supplemental head rest 152, as shown in FIG. 6. In this configuration, the child seat 110 functions in the same manner as a prior art child seat having a fixed head rest.

A child seat with a recess for a vehicle head rest is described above. Various details of the invention may be changed without departing from its scope. Furthermore, the foregoing description of the preferred embodiment of the invention and the best mode for practicing the invention are provided for the purpose of illustration only and not for the purpose of limitation—the invention being defined by the claims.

What is claimed is:

1. A child seat for being secured to a vehicle seat having a protruding vehicle head rest, the child seat comprising a seat bottom and a seat back, wherein an upper end of the seat back defines a recess at an upper margin of the seat back, the recess positioned and adapted to receive the vehicle head rest, the recess defined by two upright, spaced-apart side walls and a bottom wall and extending through from a front surface to a back surface of the upper end of the seat back.

2. A child seat according to claim 1, further including a harness comprising one or more releasably connectable straps.

3. A child seat according to claim 2, wherein the harness comprises two shoulder straps and a crotch strap which are releasably connected to a centrally positioned buckle.

4. A child seat according to claim 1, further comprising a fabric dress cover surrounding the seat back and seat bottom.

5. A child seat for being secured to a vehicle seat having a protruding vehicle head rest, the child seat comprising a seat bottom and a seat back, wherein an upper end of the seat back defines a recess positioned and adapted to receive the vehicle head rest, the child seat further including a supplemental head rest adapted to fit within the recess.

6. A child seat according to claim 5, further including means for releasably securing the supplemental head rest to the seat back.

7. A child seat according to claim 6, wherein:
the supplemental head rest includes:
(a) at least one downwardly-extending rod carrying a moveable latch;
(b) a control for selectively moving the latch between an extended position and a retracted position; and
(c) the seat back includes a cavity for receiving the rod.

8. A child seat, comprising:
(a) a seat bottom for being supported on a vehicle seat having a protruding vehicle head rest;
(b) a seat back carried by the seat bottom for providing back support to an occupant of the child seat; and
(c) a recess disposed in an upper margin of the seat back, the recess adapted to receive the vehicle head rest and allow the vehicle head rest to protrude therethrough, the recess defined by two upright, spaced-apart side walls and a bottom wall and extending through from a front surface to a back surface of the upper end of the seat back.

9. A child seat according to claim 8, further including a harness comprising one or more releasably connectable straps.

10. A child seat according to claim 9, wherein the harness comprises two shoulder straps and a crotch strap which are releasably connected to a centrally positioned buckle.

11. A child seat according to claim 8, further comprising a fabric dress cover surrounding the seat back and seat bottom.

12. A child seat, comprising:
(a) a seat bottom for being supported on a vehicle seat having a protruding vehicle head rest;
(b) a seat back carried by the seat bottom for providing back support to an occupant of the child seat;
(c) a recess disposed in an upper end of the seat back adapted to receive the vehicle head rest and allow the vehicle head rest to protrude therethrough; and
(d) a supplemental head rest adapted to fit within the recess.

13. A child seat according to claim 12, further including means for releasably securing the supplemental head rest to the seat back.

14. A child seat according to claim 13, wherein:
the supplemental head rest includes;
- (a) at least one downwardly-extending rod carrying a moveable latch;
- (b) a control for selectively moving the latch between an extended position and a retracted position; and
- (c) the seat back includes a cavity for receiving the rod.

15. A method of placing a child seat in a vehicle including a vehicle seat having a bottom cushion, a back cushion, and a vehicle head rest, the method comprising:
- (a) providing the child seat with a seat bottom and a seat back, wherein an upper end of the seat back defines a recess at an upper margin of the seat back, the recess adapted to receive the vehicle head rest, the recess defined by two upright, spaced-apart side walls and a bottom wall and extending through from a front surface to a back surface of the upper end of the seat back;
- (b) placing the seat bottom of the child seat against the bottom cushion of the vehicle seat;
- (c) placing the seat back of the child seat against the back cushion of the vehicle seat with the vehicle head rest received in and protruding forward through the recess defined by the seat back of the child seat, such that the seat back of the child seat is disposed in solid contact with the back cushion of the vehicle seat.

* * * * *